S. R. HARPER.
FLOWER POT.
APPLICATION FILED SEPT. 22, 1917.
1,255,093.
Patented Jan. 29, 1918.
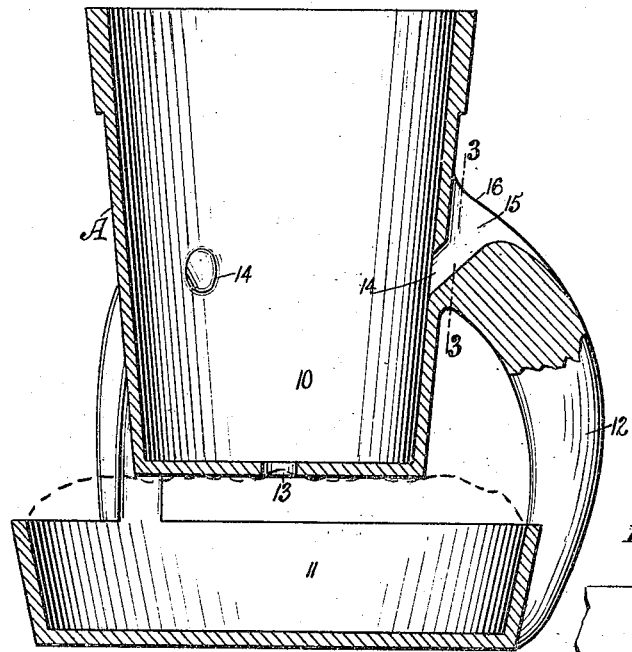
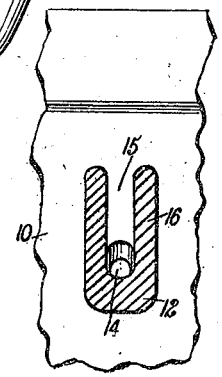
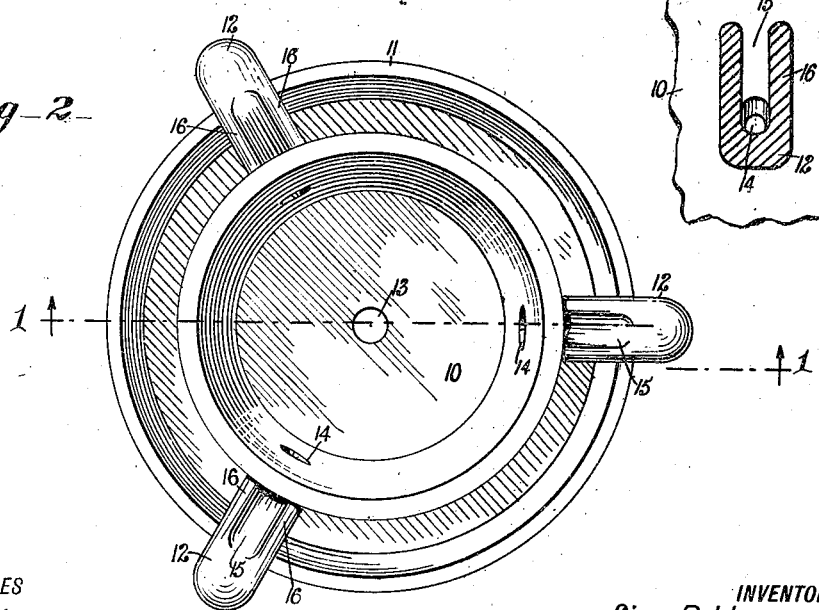
WITNESSES
INVENTOR
Sim R. Harper
BY
ATTORNEYS

UNITED STATES PATENT OFFICE.

SIM REEVES HARPER, OF BRYAN, OHIO.

FLOWER-POT.

1,255,093. Specification of Letters Patent. Patented Jan. 29, 1918.

Application filed September 22, 1917. Serial No. 192,811.

*To all whom it may concern:*

Be it known that I, SIM R. HARPER, a citizen of the United States, and a resident of Bryan, in the county of Williams and State of Ohio, have invented a new and Improved Flower-Pot, of which the following is a full, clear, and exact description.

My invention relates to flower pots and more particularly to a flower pot having the characteristic that a saucer is combined therewith and permanently held in fixed relation thereto by members serving to constitute handles which contribute as well to the ornamental appearance of the article, the arrangement being such that the article may be advantageously employed as a jardinière, if desired.

The invention is further characterized by inlet orifices in the pot at the side for supplying water or a liquid fertilizer and the inlet orifices are associated with the upper ends of the connecting handle members referred to in a manner that the liquid may be pored through the handle to the orifices in the flower pot, portions of the handle being formed to constitute guards serving as a funnel to facilitate the supplying of the liquid without spilling or splashing.

Reference is to be had to the accompanying drawings forming a part of this specification in which similar reference characters indicate corresponding parts in all the views, it being understood that the drawings are merely illustrative of one example of the invention.

Figure 1 is a sectional side elevation of a flower pot embodying my invention;

Fig. 2 is a plan view thereof;

Fig. 3 is a detail in transverse vertical section on the line 3—3, Fig. 1.

My improved article comprises a flower pot 10 of suitable shape and size with which is associated a saucer 11. Members 12 are rigidly connected at their upper ends with the flower pot 10 and at their lower ends with the saucer 11 at the sides of the said pot and saucer, respectively.

The members 12 are in practice so formed as to constitute handles and the parts are so arranged that the pot 10 is sustained above and spaced from the saucer 11 so that the bottom of the pot will not be immersed in any water that may collect in the saucer.

The bottom of the flower pot has a drain outlet 13 and in emergencies such as when the pot cannot receive attention for a reasonably long period, the saucer may be filled with a moistened sponge or moist moss, or the like, to a height as indicated for example by the dotted line in Fig. 1 so that the pot will receive a reasonable degree of moisture through the bottom to prevent complete drying out of the same as, for instance, when the owner is to be absent for an extended period.

I provide also in the pot 10 a lateral inlet orifice, or orifices, 14 preferably corresponding in number with the members 12 and the orifices are between the top and bottom of the pot so that water or a liquid manure may be supplied to the pot below the top thereof, thereby avoiding the hardening of the surface of the soil following the watering at the top. In order to prevent splashing and spilling of the water supplied to the orifices 14 and to facilitate the supplying of the water I form in the members 12 at the upper ends openings 15 in register with the orifices 14, the formation of the openings 15 being such that side flanges 16 are produced on each handle member to constitute guards, the openings thus being in effect funnels leading to the orifices 14.

The form of the article is such that it will have the appearance of a jardinière and is in effect a combined flower pot and jardinière, and it will be clear that the form and arrangement of the parts are such as to produce the desired esthetic effects while fully preserving and indeed increasing the utile features of the article.

The article is adapted to be produced from porcelain, terra cotta, clay and like materials.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. An article of the class described adapted to be employed as a flower pot or jardinière and including a flower pot, a saucer beneath the same, and handle members rigidly uniting the pot, the said pot having an inlet orifice in a side thereof between the top and bottom, one of the said handle members having an opening in register with and leading to the said inlet orifice.

2. A flower pot having an inlet in a side thereof between the top and bottom for supplying a liquid to the pot, and a handle member on the pot at a side thereof, the said handle member at its juncture with the pot having an opening in register with the said inlet orifice and presenting side guard flanges constituting the said opening a funnel.

SIM REEVES HARPER.

Witnesses:
R. H. LANPHERE,
J J. MEBORD.